(12) United States Patent
Horsley et al.

(10) Patent No.: US 10,859,592 B2
(45) Date of Patent: Dec. 8, 2020

(54) METHOD OF ASPIRATING BY PIPETTING AND PIPETTING APPARATUS

(71) Applicant: TECAN Trading AG, Mannedorf (CH)

(72) Inventors: Michael Horsley, San Jose, CA (US); Kevin Truempi, San Jose, CA (US); Sukesh Gopinathan, San Jose, CA (US)

(73) Assignee: TECAN TRADING AG, Mannedorf (CH)

( * ) Notice: Subject to any disclaimer, the term of this patent is extended or adjusted under 35 U.S.C. 154(b) by 380 days.

(21) Appl. No.: 15/420,693

(22) Filed: Jan. 31, 2017

(65) Prior Publication Data

US 2018/0214862 A1 Aug. 2, 2018

(51) Int. Cl.
| *G01N 35/10* | (2006.01) |
| *B01L 3/02* | (2006.01) |
| *G01N 1/14* | (2006.01) |
| *G01N 35/00* | (2006.01) |
| *G01N 11/08* | (2006.01) |

(52) U.S. Cl.
CPC ........ *G01N 35/1016* (2013.01); *B01L 3/0237* (2013.01); *G01N 1/14* (2013.01); *G01N 35/00623* (2013.01); *B01L 2200/143* (2013.01); *B01L 2300/0627* (2013.01); *G01N 11/08* (2013.01); *G01N 2001/1418* (2013.01)

(58) Field of Classification Search
CPC .. B01L 3/021; B01L 3/0237; B01L 2200/143; B01L 2200/146; B01L 2300/0627; G01N 35/00623; G01N 35/1016; G01N 11/08
USPC .................. 73/1.74, 863.02, 864.01, 864.11
See application file for complete search history.

(56) References Cited

U.S. PATENT DOCUMENTS

| 6,370,942 B1* | 4/2002 | Dunfee .................... G01M 3/26 |
| | | 73/1.74 |
| 2013/0073243 A1* | 3/2013 | Beumer ............. G01N 35/1016 |
| | | 702/100 |
| 2016/0157704 A1* | 6/2016 | Hsieh .................. G01N 35/1016 |
| | | 702/55 |
| 2016/0273951 A1* | 9/2016 | van der Schoot .. G01F 25/0092 |

* cited by examiner

*Primary Examiner* — Benjamin R Schmitt
(74) *Attorney, Agent, or Firm* — Notaro, Michalos & Zaccaria P.C.

(57) ABSTRACT

Aspiration of a pipette arrangement is initiated. A sensor arrangement senses a least one prevailing first parameter that is dependent from the effect in the pipette arrangement during initiating and upholding the suctioning action. This at least one parameter is analyzed in an analyzing stage. From a result of this analysis and in a determining stage at least one test criterium TC for at least one further parameter as sensed by the sensor arrangement is determined. In a checking stage there is checked whether this further parameter fulfills the at least one test criterium.

25 Claims, 5 Drawing Sheets

METHOD OF ASPIRATING BY PIPETTING AND PIPETTING APPARATUS

BACKGROUND OF THE INVENTION

The present invention is directed to a method of aspirating a dose of a liquid by pipetting and to a method for manufacturing a dose of a liquid including the addressed method of aspirating.

FIELD OF THE INVENTION

For aspirating a dose of a liquid by pipetting, there is applied to the inner space of a pipette, once the tip of the pipette is in its aspiration position and should be immersed in the liquid to be aspired, a suctioning action or effect by means of a suctioning source.

The suctioning action or effect is transmitted from the suctioning source to the tip of the pipette by a work fluid. The work fluid may consist of a liquid section or column or of a gaseous fluid section or of liquid sections with gaseous section in between and/or of a liquid section with a gaseous section at one or at both ends thereof. To avoid contact of the liquid being aspired with a liquid component of the work fluid it is common practice to select at least that section of the work fluid which contacts the liquid as aspired of a gaseous fluid. In spite of the fact that it is not excluded in the frame of the present invention that a liquid section of the work fluid is exploited in the pipette and down to its tip, the present invention particularly addresses a gaseous work fluid section in the pipette and down to its tip as well as in a pipette applicator arrangement of a pipetting apparatus.

Once the suctioning action is initiated, conditioned by the suctioning action and dependent therefrom, parameters, i.e. physical entities at the pipetting apparatus as e.g. pressures, flows, weights etc. change due to additional material being taken up into the pipetting apparatus.

It is widely known to check an aspiration cycle for correctness, i.e. acceptability, or non-correctness, i.e. non-acceptability, by establishing, generically spoken, criteria for parameters as addressed above which depend from the effect of suctioning action. Such criteria must be fulfilled by the respectively prevailing parameters during an aspiration cycle, which is considered acceptable.

DESCRIPTION OF THE INVENTION

It is an object of the present invention to provide an improved method of and apparatus for aspirating.

This is achieved by the method of aspirating a dose of a liquid by pipetting in an aspirating cycle, or of manufacturing a dose of a liquid including such aspirating method, comprising:
  a) Moving a pipette containing a work fluid in an aspiration position;
  b) Initiating at a point in time a suctioning action to the work fluid.

When we speak throughout the present description and claims from a "point in time" the term "point" is not to be understood as a "point" according to geometric definitions but is to be understood as a short time interval just necessary to perform the respectively addressed technical action.

The method further comprises:
  c) Analyzing at least one prevailing first parameter, being dependent from the effect or result of the suctioning action, within a first time span and subsequent the addressed initiating;

In this analyzing step the at least one first prevailing parameter is evaluated. More than one first prevailing parameter may be evaluated.

The method further comprises:
  d) Determining at least one test-criterion in dependency of at least one result of the analyzing;

The analyzing step may result in more than one result. One test-criterion may be dependent from a single analyzing result or from a combination of analyzing results. Also, more than one test criterion may be determined in dependency of a single analyzing result or in dependency of respective combinations of analyzing results.

Determining the at least one test-criterion may be done by calculation, e.g. if there exists a explicit mathematical function between the at least one analyzing result and the at least one test-criterion, e.g. proportionality, or by means of a look up table wherein analyzing results, possibly combinations thereof, are attributed to respective test-criteria.

The method further comprises:
  e) Checking at least one second prevailing parameter, being dependent from the effect or result of the suctioning action, within a second time span subsequent to the addressed determining, upon whether the at least one prevailing second parameter does or does not fulfill the at least one test-criterion.

When we speak of performing an action "within a time span" this means that such action is performed one time or more than one time within the time slot of the time span or is performed all along the time span.

The method further comprises:
  f) Identifying the aspiration cycle as acceptable or as not acceptable in dependency of a result of the checking step.

When we speak of "the effect of the suctioning action" we understand the aspiration effect which is caused by initiating and upholding the suctioning action. Such effect is dependent from the behavior of the suctioning action per se, once initiated, as well as from the effect of the suctioning action in the pipette.

The inventors have thus found that:
  a) a multitude of conditions and of combinations thereof, which determine the effect or result of the suctioning action lead to the same behavior of at least one prevailing first parameter during a first time span subsequent initiating of the suctioning action.
  Conditions, which determine the effect or result of the suctioning action, are e.g. acceleration and deceleration of a suctioning pump in the different phases of the aspiration cycle, the amount of liquid to be aspirated, the starting pressure of the work fluid when suctioning is initiated, viscosity of the liquid to be aspired and from its density, the volume and shape of the inner space of the pipette, presence or non-presence of a pipette filter, pipette orifice shape and size, immersion depth of the pipette tip into the liquid to be aspired etc. conditions, which are possibly known. Besides of such conditions which may be known in advance, variations of such conditions, as by tolerances, are normally not known.
  b) initial behavior of at least one prevailing first parameter, largely independently from the conditions as addressed above and possibly combinations thereof, may be taken into account by at least one respectively selected test-criterion to be applied to at least one prevailing second prevailing parameter to decide about acceptability of the overall aspiration cycle.

Thus, one needs not to know the conditions which influence the suctioning effect with the target of setting test criteria. It suffices to know the behavior if the prevailing first parameter during a time span subsequent initialization of the suctioning effect.

This allows to significantly reduce the number of entities, the addressed conditions and combinations thereof, to be taken in account for checking the behavior of the system during the aspiration cycle. The amount of data e.g. in a lookup table associating analyzing results to test-criteria may be significantly reduced compared with a lookup table which must be installed if every influencing condition and combinations thereof are to be considered separately.

If, as a simple example e.g. two sets or combinations of conditions have to be taken in account, two test-criteria have to be established which may be equal or different. If, according to the invention, the two sets of conditions are recognized as leading to the same behavior of an initially prevailing first parameter and this behavior may be taken as decisive for setting of the at least one test criterion, instead of two data-sets for the conditions, only one data-set for the first parameter behavior must be known in advance and respectively stored.

In one variant of the method according to the invention the at least one prevailing first parameter at least comprises at least one of at least one pressure and of a flow dependent from at least one prevailing pressure in the work fluid, the work fluid being a liquid or at least comprising at least one a gaseous section.

When we speak of "at least one pressure" this shall include e.g. a difference between two pressure values.

In one variant of the method according to the invention the at least one prevailing first parameter is at least one of at least one pressure and of a flow of the work fluid, the work fluid being a liquid or at least comprising at least one gaseous section.

In one variant of the method according to the invention the at least one prevailing second parameter at least comprises at least one of at least one pressure and of a flow dependent from at least one prevailing pressure in said work fluid, said work fluid being a liquid or at least comprising at least one gaseous section.

In one variant of the method according to the invention the at least one prevailing second parameter is at least one of at least one pressure and of a flow of said work fluid, said work fluid being a liquid or at least comprising at least one gaseous section.

In one variant of the method according to the invention the at least one prevailing first parameter at least comprises at least one of at least one pressure and of a flow at least dependent from at least one prevailing pressure in the work fluid, the work fluid being a liquid or at least comprising at least one gaseous section and the at least one prevailing second parameter at least comprises at least one of at least one pressure and of a flow at least dependent from at least one prevailing pressure in the work fluid.

In one variant of the method according to the invention
the at least one prevailing first parameter is at least one of at least one pressure and of a flow of the work fluid said work fluid being a liquid or at least comprising at least one gaseous section and
the at least one prevailing second parameter is at least one of at least one pressure and of a flow of said work fluid.

In one variant of the method according to the invention the analyzing comprises analyzing at least one first characteristic over time of the at least one prevailing first parameter.

In one variant of the method according to the invention, the analyzing comprises analyzing at least one first characteristic over time of the at least one prevailing first parameter and wherein there prevails at least one of:
  said at least one prevailing first parameter at least comprising at least one of at least one pressure and of a flow at least dependent from at least one prevailing pressure in said work fluid, said work fluid being a liquid or at least comprising at least one gaseous section and of
  said at least one prevailing first parameter is at least one of at least one pressure and of a flow of said work fluid said work fluid being a liquid or at least comprising at least one gaseous section and of
  said at least one prevailing second parameter at least comprises at least one of at least one pressure and of a flow at least dependent from at least one prevailing pressure in said work fluid, said work fluid being a liquid or at least comprising at least one gaseous section and of
  said at least one prevailing second parameter is at least one of at least one pressure and of a flow of said work fluid said work fluid being a liquid or at least comprising at least one gaseous section.

In one variant of the method according to the invention determining the at least one test-criterion comprises determining at least one rated second characteristic over time for said at least one prevailing second parameter.

In one variant of the method according to the invention determining the at least one test-criterion comprises determining at least one rated second characteristic over time for the at least one prevailing second parameter and wherein there prevails at least one of:
  said at least one prevailing first parameter at least comprising at least one of at least one pressure and of a flow at least dependent from at least one prevailing pressure in said work fluid said work fluid being a liquid or at least comprising at least one gaseous section and of
  said at least one prevailing first parameter is at least one of at least one pressure and of a flow of said work fluid said work fluid being a liquid or at least comprising at least one gaseous section
  said at least one prevailing second parameter at least comprises at least one of at least one pressure and of a flow at least dependent from at least one prevailing pressure in said work fluid said work fluid being a liquid or at least comprising at least one gaseous section and of
  said at least one prevailing second parameter is at least one of at least one pressure and of a flow of said work fluid said work fluid being a liquid or at least comprising at least one gaseous section
  analyzing comprises determining at least one first characteristic over time of said at least one prevailing first parameter.

In one variant of the method according to the invention, analyzing comprises analyzing a first time derivative of at least one of at least one pressure and of a flow dependent from said effect of said suctioning action.

In one variant of the method according to the invention, said analyzing comprises analyzing a first time derivative of at least one of at least one pressure and of a flow dependent from said effect of said suctioning action and wherein there prevails at least one of:
  the work fluid is a liquid or at least comprising at least one gaseous section;

the at least one prevailing first parameter is at least one of at least one pressure and of a flow of the work fluid, the work fluid being a liquid or at least comprising at least one gaseous section the at least one prevailing second parameter at least comprises at least one of at least one pressure and of a flow at least dependent from at least one prevailing pressure in the work fluid, the work fluid being a liquid or at least comprising at least one gaseous section the at least one prevailing second parameter is at least one of at least one pressure and of a flow of the work fluid, the work fluid being a liquid or at least comprising at least one gaseous section the analyzing comprises determining at least one first characteristic over time of the at least one prevailing first parameter, determining the at least one test-criterion comprises determining at least one rated second characteristic over time of the at least one prevailing second parameter.

In one variant of the method according to the invention, the analyzing comprises analyzing a first time derivative of at least one of at least one pressure and of a flow dependent from said effect of said suctioning action, the at least one pressure or flow having the following prevailing time course:

The first time derivative alters after the point in time towards an extremum value occurring at a moment and returns to some extent after said moment; determining is performed within the time span between the point in time and the moment, latter inclusive.

In one variant of the method according to the invention said analyzing comprises analyzing a first time derivative of at least one of at least one pressure and of a flow dependent from said effect of said suctioning action, said at least one pressure or said flow having the following prevailing time course:

The first time derivative alters after said point in time towards an extremum value occurring at a moment and returns to some extent after said moment;

said determining is performed within the time span between said point in time and said moment, latter inclusive and wherein there prevails at least one of:

said at least one prevailing pressure or flow is respectively a pressure or a flow of said work fluid, said work fluid being a liquid or at least comprising at least one gaseous section and of said at least one prevailing second parameter at least comprises at least one of at least one pressure and of a flow at least dependent from at least one prevailing pressure in said work fluid, said work fluid being a liquid or at least comprising at least one gaseous section, and of said at least one prevailing second parameter is at least one of at least one pressure and of a flow of said work fluid, said work fluid being a liquid or at least comprising at least one gaseous section, and of said analyzing comprises analyzing a first time derivative of at least one of at least one pressure and of a flow dependent from said effect of said suctioning action and of determining said at least one test-criterion comprises determining at least one rated characteristic over time of said at least one prevailing second parameter said checking is performed at a time subsequent said moment.

In one variant of the method according to the invention which may be combined with any variant already addressed unless in contradiction, the analyzing comprises evaluating at least one of at least one pressure value;

at least one flow value at least one value of a first time derivative of a pressure course at least one value of a first time derivative of a flow course;

at least one value of a second time derivative of a pressure course at least one value of a second time derivative of a flow course.

In one variant of the method according to the invention which may be combined with any variant already addressed unless in contradiction, the at least one test-criterion comprises a range for at least one of a pressure value;

a flow value;

a first time-derivative of a pressure course a first time-derivative of a flow course a second time-derivative of a pressure course a second time-derivative of a flow course.

In one variant of the method according to the invention which may be combined with any variant already addressed unless in contradiction, analyzing comprises evaluating at least one of at least one pressure value;

at least one flow value;

at least one value of a first time derivative of a pressure course at least one value of a first time derivative of a flow course at least one value of a second time derivative of a pressure course at least one value of a second time derivative of a flow course and the at least one test-criterion comprises a range for at least one of a pressure value;

a flow value;

a first time-derivative of a pressure course a first time-derivative of a flow course a second time-derivative of a pressure course a second time-derivative of a flow course.

In one variant of the method according to the invention which may be combined with any variant already addressed unless in contradiction said test criterion is a range and said checking is performed after said prevailing second parameter enters said range for a first time.

We address the occurrence of an extremum "at a moment" rather than "at a point in time" because an extremum detection may be somehow unsharp, e.g. dependent of signal noise and time/signal-value scaling.

Addressing a generic point:

It has to be considered that the method according to the invention might not be the sole procedure to check whether a prevailing aspiration cycle is acceptable or not. E.g. we have addressed that the pipette is moved in an aspiration position. Whether in this position the tip of the pipette is immersed in the liquid to be aspired or not, is instantaneously recognized e.g. from the prevailing pressure course in the pipette. The suctioning action will result in a prevailing pressure of the work fluid varying much less than when the tip would be immersed into a liquid. This may be detected immediately after initiating the aspiration cycle without exploiting the method according to the present invention. Thus, and as may be seen from this example, additional tests may be performed to check an aspiration cycle on acceptance.

A test-criterion range as addressed above may be constant or may vary over time with respect to its width and/or its average value.

All variants of the method according to the invention, which were addressed, may be combined if they are not in contradiction.

The present invention is further directed to a pipetting apparatus comprising a pipette applicator arrangement for at least one pipette, a suction source in flow communication with an inner space of the pipette applicator arrangement, a sensor arrangement operationally connected to this inner space, the output of the sensor arrangement being operationally connected to an aspiration-cycle testing unit. The aspiration-cycle testing unit is configured to perform:

Reception of a control signal representative for the pipette applicator arrangement having reached an aspiration position;

Initiating, upon said control signal, applying to said inner space a suctioning action by said suction source at a point in time;

Analyzing a signal dependent from an output signal of said sensor arrangement subsequent to said initiating;

Determining at least one test-criterion in dependency of a result of said analyzing;

Checking in a second time span, subsequent to said determining, whether a signal dependent from an output signal of said sensor arrangement does or does not fulfill said at least one test-criterion;

Generating an indication whether said aspiration cycle is acceptable or not acceptable in dependency of a result of said checking.

One embodiment of the apparatus according to the invention is configured to perform the method according to the invention or according to one or more than one of its variants.

BRIEF DESCRIPTION OF THE DRAWINGS

The present invention shall now be further exemplified with the help of figures. The figures show.

DETAILED DESCRIPTION OF THE INVENTION

Figure 1:
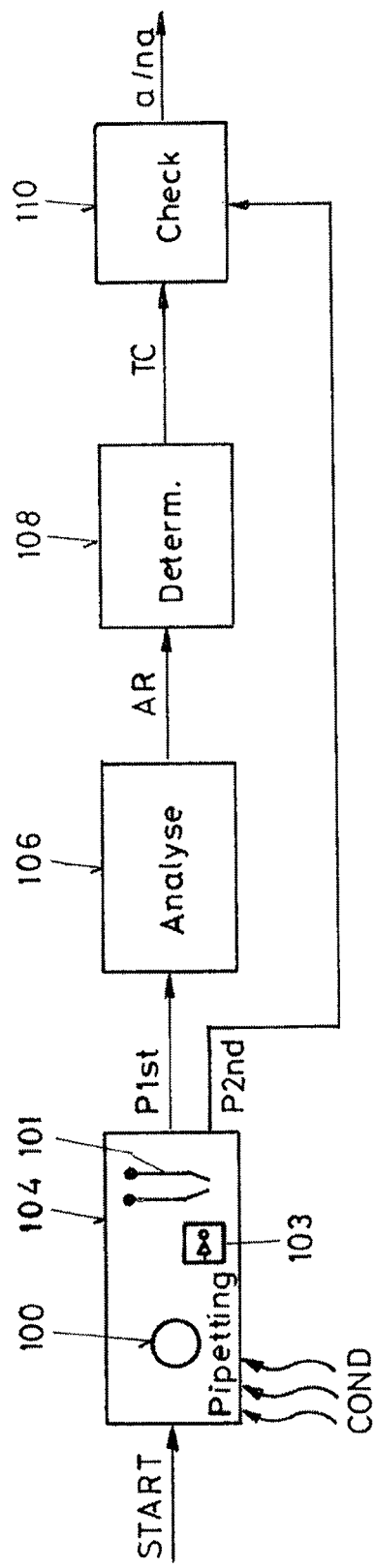
FIG. 1: by means of a generic signal-flow/functional-block diagram, the principle of the invention.

FIG. 1 most schematically shows, by means of a functional-block/signal-flow diagram the principle of the present invention.

By means of a start signal, START suctioning action by a pumping facility 100 upon the pipette arrangement 101 is initiated. A sensor arrangement 103 senses at least one prevailing first parameter P1st that is dependent from the effect in the pipette arrangement 101 of initiating and upholding the suctioning action. The pumping facility 100, the pipette arrangement 101, the sensor arrangement 103 are represented in a hardware block 104 in FIG. 1. Multiple conditions CON as of the suctioning facility, the liquid to be aspired, and the pipette influence the effect of initiating and upholding the suctioning action. The at least one prevailing first parameter P1st is analyzed in a analyzing stage 106. At least one analyze result RA determines in a determining stage 108 at least one test-criterion TC for at least one second parameter P2nd sensed by the sensor arrangement 103. The at least one second parameter P2nd, prevailing after the test-criterion having been determined, is checked in a checking stage 110 whether it fulfills the at least one test-criterion TC. If the at least one second prevailing parameter P2nd fulfills the at least one test-criterion TC, the aspiration cycle is considered acceptable, if the at least one second prevailing parameter P2nd does not fulfil the at least one test-criterion TC, the aspiration cycle is not accepted. This is represented in FIG. 1 by a/na.

Figure 2:
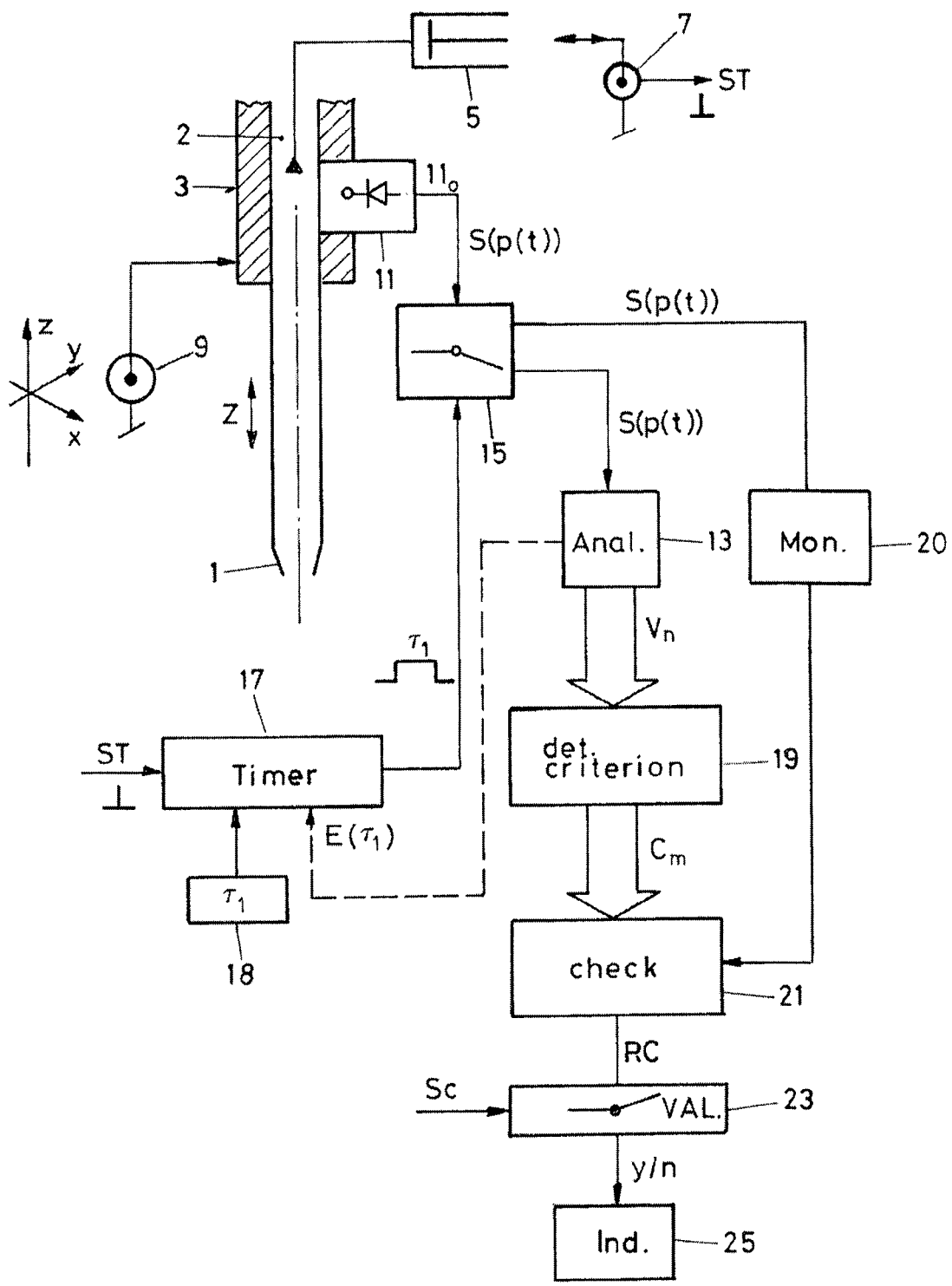
FIG. 2: schematically and simplified by means of a signal-flow/functional-block diagram, the method and apparatus according to the invention.

FIG. 2 most schematically and simplified shows, by means of a signal flow/functional block diagram a more specific example of the method according to the present invention and of a structure of the apparatus according to such example of the invention.

A pipette 1 is mounted to a pipette applicator arrangement 3. The pipette applicator arrangement 3 may be tailored to receive one or more than one of the pipettes 1. An inner space 2 of the pipette applicator arrangement 3 communicating with one or more than one of the pipette 1 and is operationally in flow communication with a suction facility or source 5 shown in FIG. 2 as a plunger pump. The suction source 5 is driven in a controlled manner by a drive 7, which e.g. generates a start signal ST when an aspiration cycle is initiated.

The pipette applicator 3 is driven in a controlled manner by a drive 9, up and down as shown with a double-arrow Z and, customarily, additionally in the x/y plane.

According to the embodiment of FIG. 2 the inner space 2 of the pipette-applicator arrangement 3, is filled with a gaseous work fluid section, especially with air.

A pressure sensor arrangement 11 monitors the pressure p(t) in the inner space 2 of the pipette applicator 3 which is operative on the pipette 1. Instead of or additionally to a pressure sensor arrangement, a flow sensor arrangement may be provided (not shown in FIG. 2). At the output $11_o$ of the pressure sensor arrangement 11 a signal S(p(t)) is generated, e.g. a digital signal, representing the prevailing pressure p(t) in the gaseous section of the work fluid. The output $11_o$ of the pressure sensor arrangement 11 is first operationally fed to an analyzing stage 13. As shown schematically by a switching unit 15, this is initiated e.g. by a timer stage 17, triggered by the start signal ST which is e.g. generated by the drive 7 as the pipette tip arrived at the aspiration position.

Within the time span $\tau_1$ the signal S(p(t)) and thus the time course of the pressure p(t), as a prevailing first parameter, prevailing during this time span $\tau_1$ in the work fluid in the pipette applicator arrangement 3, is analyzed.

The result of the analysis in analyzing stage 13 is one or more than one characteristic values of the time course of the pressure p(t) as it prevails during $\tau_1$ in the work fluid.

Such characteristic value may be e.g.:

One or more than one pressure values at respectively selected moments, possibly averaged over selected time spans, The pressure value of an extremum of the pressure, possibly averaged over a selected time span, The time or time slot when the pressure achieves an extremum, One or more than one values of a first time derivative of the time course of the pressure at respectively selected moments, possibly averaged over selected time spans, The extremum value of the first time derivative of the time course of the pressure The time or time slot when the first time derivative of the pressure achieves an extremum;

One or more than one values of second time derivative of the time course of the pressure at respectively selected moments, possibly averaged over selected time spans The time sequence in which specific characteristic values occur etc.

The time span $\tau_1$, initiated at the start of aspirating, has either a predetermined duration as shown in FIG. 2 by selecting unit 18 or the end of $\tau_1$ is set by a selected behavior of the prevailing time course of the prevailing pressure p(t), e.g. by the occurrence of an extremum of the first time derivative of the prevailing time course of the prevailing pressure p(t) as of an example described later. Thus, the end of $\tau_1$ may be triggered by a result of the analyzing in analyzing stage 13, as shown in FIG. 2 in dash line at $E(\tau_1)$. At the end of the time span $\tau_1$ analyzing is terminated.

The result data of the analyzing process in analyzing stage 13 are addressed in FIG. 2 by $V_n$. They are fed to a determining stage 19. In the determining stage 19 one or more than one test criteria $C_n$ are determined in dependency of the one or more than one result values $V_n$ of the analyzing in the analyzing stage 13. The number m of test criteria determined by the determining stage 19 is independent from the number n of result values of the analyzing step.

The test criteria may be e.g.:

One or more than one range for pressure values in one or in more than one time spans of the aspiration cycle, whereby such ranges may be constant over a respective time span, may vary in width along a respective timespan and/or may vary with respect to the average value of the range.

One or more than one ranges for the first time derivative and/or second time derivative of the time course of the pressure in one or in more than one time spans of the aspiration cycle, whereby such ranges may be constant over a respective time span, may vary in width along a respective timespan and/or may vary with respect to the average value of the range.

From one single result value $V_1$ of the analysis one test criterion $C_1$ or more than one test criteria $C_1, C_2 \ldots$ may be determined by the determining stage 19.

On the other hand more than one result values $V_1$, $V_2 \ldots$ of the analyzing in analyzing stage 13 may be combined by the determining stage 19 to determine a single test criterion, $C_x(V1, V2 \ldots )$.

Determining the test criteria may be performed by calculation or by exploiting a lookup table wherein analysis results $V_n$ and possibly combinations thereof and respective test criteria $C_m$ are mutually collated.

After the analyzing time span $\tau_1$ and after the test-criteria have been determined, the output signal S(p(t)) of the sensor arrangement 11, as schematically shown by the switching unit 15, is fed as input to a checking stage 21, as a prevailing second parameter. The test criteria $C_m$ as well are input to the checking stage 21.

By the checking stage 21 the prevailing time course of the prevailing pressure p(t) is checked whether it fulfills the test criteria $C_m$.

It becomes evident, that under a more generic consideration, the first parameter subjected to analysis and the second parameter subjected to checking as of FIG. 1 may be the same parameter.

Dependent on the fact which test criteria have been established by the determining stage 21, the respective prevailing characteristic is monitored at the prevailing time course of the prevailing pressure, according to signal S(p(t)), in a monitoring stage 20. Thus if e.g. one of or the test criteria is directed to the first time derivative of the time course of the pressure, before performing the checking operation upon such test criterion, the prevailing first time derivative at the prevailing time course of the pressure is monitored at stage 20.

Whereas the checking operation may be initiated just after completion of the analyzing step, just after termination of $\tau_1$ and of completion of determining the one or the more than one test criterion at stage 19, the moment or the time span in which checking is considered to be significant is to be separately considered.

As shown in FIG. 2 the checking result RC is first passed to a validation stage 23. The validation stage 23 acts like a controlled switch. After or during applying a control signal Sc to the validation stage 23 the checking result RC is considered a valid qualification of the aspiration cycle with respect of its acceptability or non-acceptability.

The control signal Sc may be generated e.g. at a predetermined moment and/or during a predetermined time span of the aspiration cycle, as e.g. controlled by the timer stage 17, or e.g. when one of the test criteria is fulfilled, e.g. first time fulfilled, as will be exemplified.

Once the checking result RC is validated as a validity indication of the aspiration cycle, acceptability y/n is indicated at the indication stage 25.

Please note that the first and/or second parameters, which have been exemplified in the embodiment of FIG. 2 as pressure-values, may be realized by flow values. This is also valid for the subsequent considerations.

EXAMPLES

Figure 3:
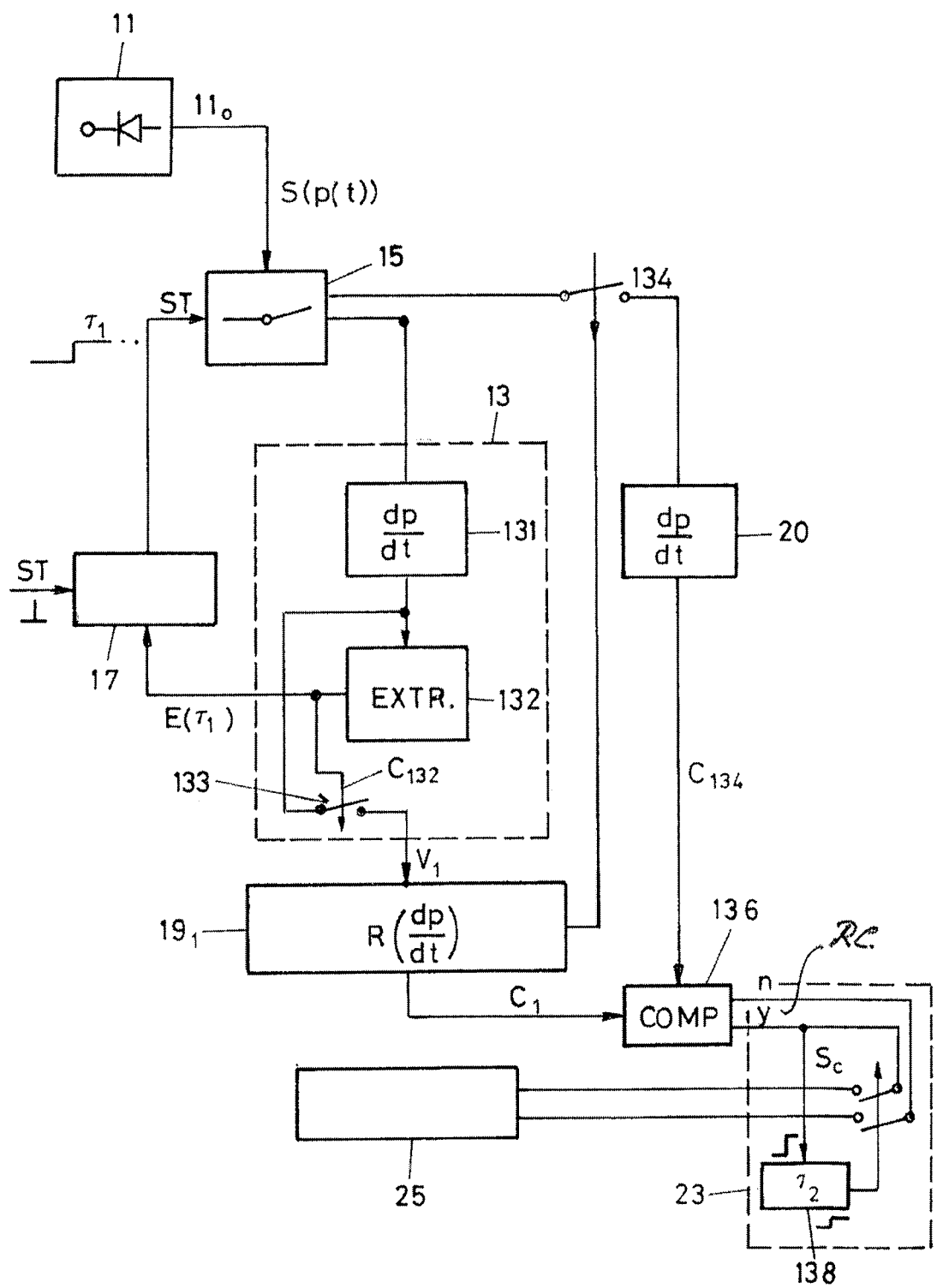
FIG. 3: in a representation in analogy to that of FIG. 1, a variant of the method and an embodiment of the apparatus according to the invention.
Figure 4:
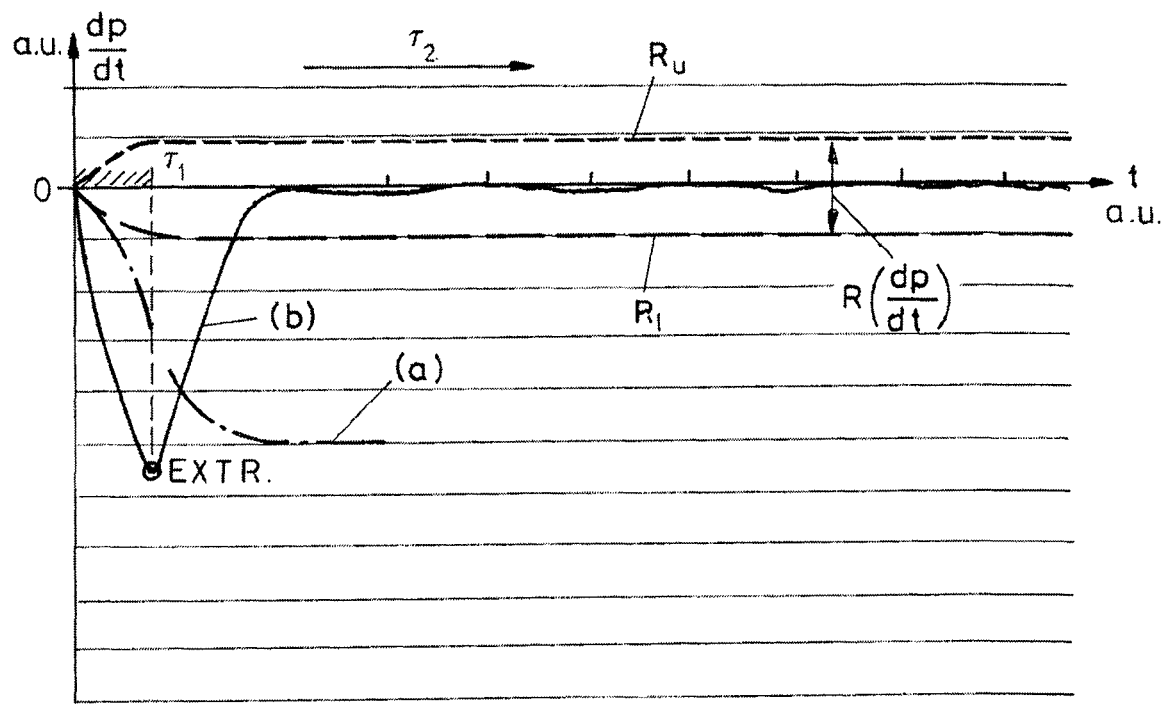
FIGS. 4 to 6: Characteristics of different aspiration cycles as exploited by and as resulting from the method and apparatus according to the example of FIG. 3.
Figure 5:
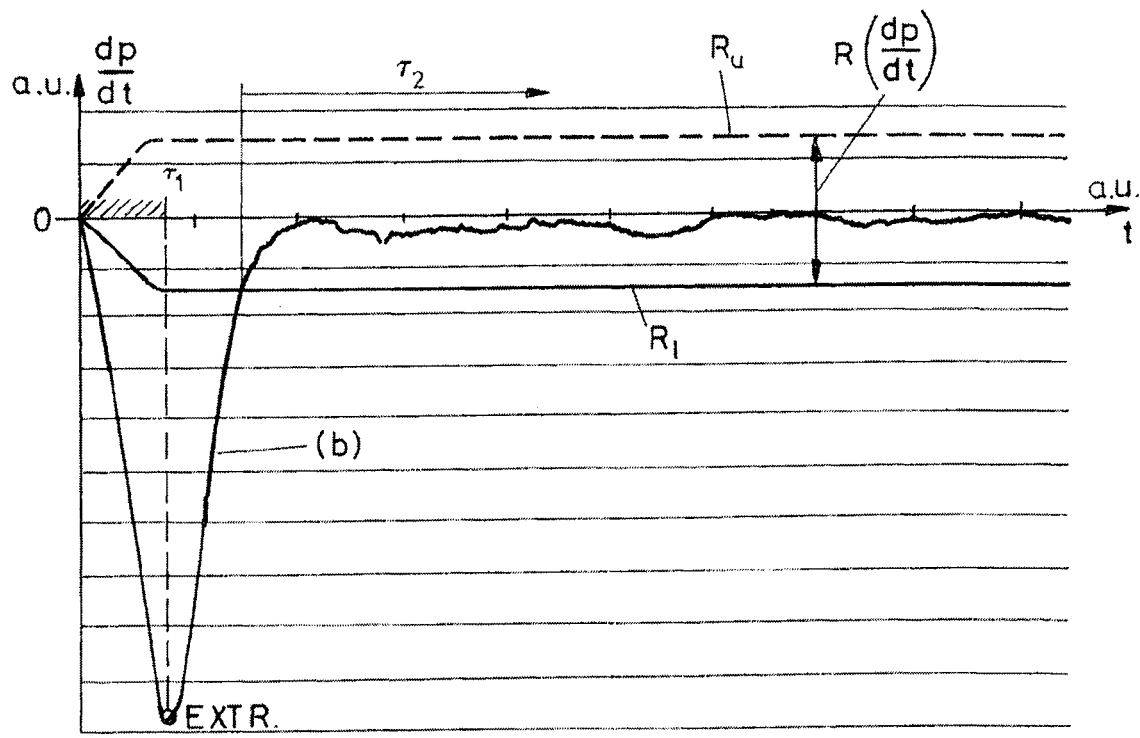
Figure 6:
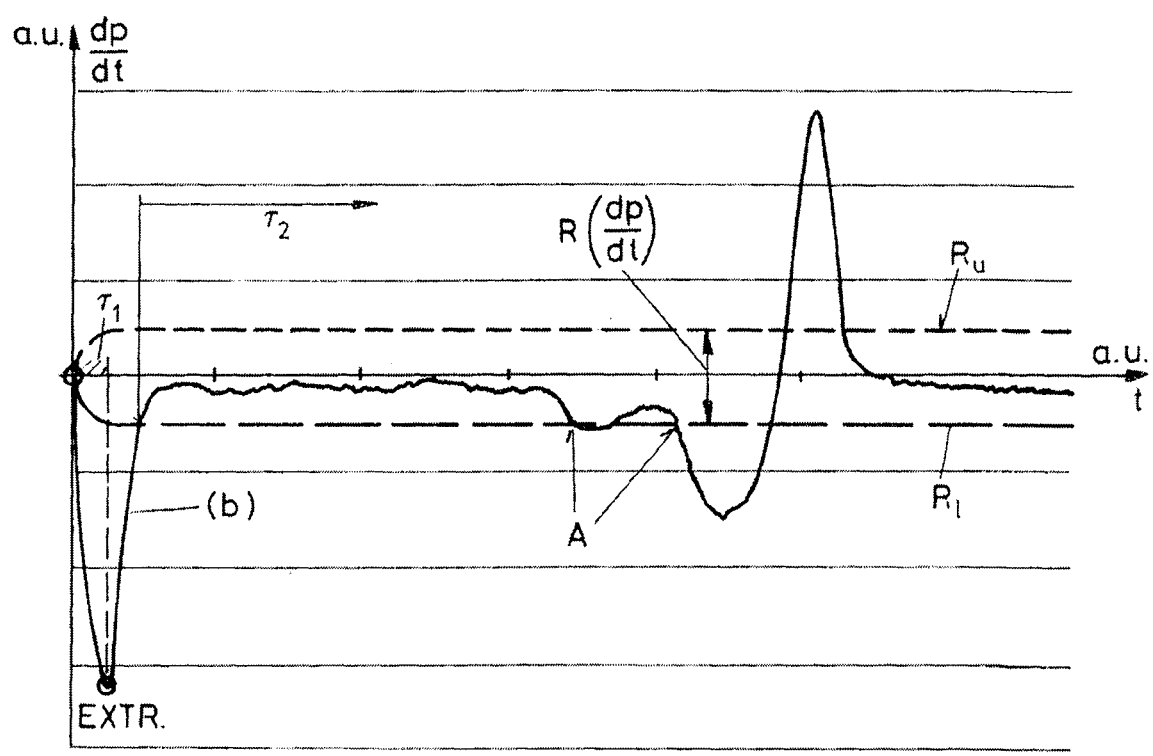

The method and apparatus of the invention are now further exemplified by a variant and an embodiment according to FIG. 3 and characteristics according to the FIGS. 4 to 6.

FIG. 3 is a representation in analogy with that of FIG. 2. The same reference numbers are used for those parts already addressed in context with FIG. 2.

Upon start Signal ST, the timer stage 17 switches, as schematized by switching unit 15, the signal S(p(t)) to the analyzing stage 13. The pressure p(t) drops as qualitatively shown in FIG. 4 by dash doted characteristic (a).

The analyzing stage 13 comprises a differentiating stage 131 in which the first time derivative of S(p(t)) is calculated. This first time derivative, resulting from the dropping pressure as of (a) is shown in FIG. 4 by characteristic (b).

Please note the scaling in FIGS. 4 to 6 is in arbitrary units.

The analyzing stage 13 further comprises an extremum detection stage 132, which detects occurrence of the extremum EXTR of the first time derivative. Detection of the extremum EXTR controls, as shown by control signal $E(\tau 1)$ termination of the time span $\tau_1$. Once the extremum EXTR is detected, the extremum value of the first time derivative is determined as the analyzing result $V_1$. At this time the relevant analyzing result $V_1$ i.e. the value of EXTR, is fed to the determining stage $19_1$ as schematically shown by control signal $C_{132}$ and switching unit 133. Further, as schematically shown by switching unit 15, the signal S(pt) is now disconnected from the input to analyzing stage 13.

In dependency of $V_1$, the determining stage $19_1$ determines, as a test criterion $C_1$, a range R (dp/dt) for the values of the first time derivative of the time course of the pressure. This range is shown in FIG. 4 by the upper limit $R_u$ and the lower limit $R_1$ characteristics.

Whereas termination of the analyzing time span $\tau_1$ is controlled in this embodiment or variant, by detecting the extremum EXTR of the first time derivative of the time course of the pressure, it is only after that the test criterion $C_1$ has been determined by determining stage $19_1$, that the signal S(p(t)) is fed, as schematically represented via switch unit 15 and a switch unit 134 to the monitoring stage 20 whereat, in this embodiment, the first time derivative of the signal S(p(t)), as the second parameter, is monitored.

The test criterion $C_1$, determined in dependency from the analyzing result $V_1$, e.g. by calculation or by making use of a look up table, is fed to a comparator stage 136, according to the checking stage 21 of FIG. 2, where it is compared with the prevailing first time derivative of the prevailing time course of the prevailing pressure.

The comparison result RC is represented in FIG. 4 by an output n and an output y of the comparator stage 136. If the prevailing first time derivative of the prevailing time course of the pressure is within the test range R (dp/dt) than a signal is generated at the output y otherwise at output n.

According to the validation stage 23 of FIG. 3, when the output y is activated for the first time, i.e. when the prevailing time derivative enters the range R(dp/dt) for the first time, the signal $S_c$ triggers a unit 138, operating as a monostable unit, and from this moment and for the subsequent time span $\tau_2$ shown in FIG. 4, the output of the comparator stage 136 is considered as validated for indicating at the indicator stage 25, whether -y- the actual aspiration cycle is valid or -n- invalid. As may be seen in FIG. 4, the time course of the first time derivative of the pressure p(t) remains within the range R(dp/dt) during the time span $\tau_2$ and is therefore considered as acceptable.

FIG. 5 shows characteristics of a different aspiration cycle, in same representation as FIG. 4 and with the same scaling. The aspiration is significantly faster than in the example of FIG. 4, i.e. the value of the extremum EXTR is significantly larger than that in FIG. 4. The test criterion R(dp/dt) is, dependent from the larger analysis result, larger.

The aspiration cycle shown in FIG. 5 is acceptable too.

FIG. 6 shows the characteristics of a further aspiration cycle. The scaling accords with that of FIGS. 4 and 5, although being shown enlarged.

The value of EXTR is lower than that in FIG. 4 and thus the range R(dp/dt) dependent therefrom is smaller. As may be seen, the time course of the first time derivative of the pressure p(t) leaves within $\tau_2$ the rated characteristic, i.e. the test criterion range, at the moment A, which course is attributed to a blockage of the pipette. The aspiration cycle as of FIG. 6 is considered not acceptable.

Thus and according to the present invention, a method of aspirating a dose of a liquid by pipetting in an aspirating cycle, or of manufacturing a dose of a liquid including such aspirating method, and a pipetting apparatus are conceived, by which, automatically, an aspiration cycle is first analyzed and then checked on acceptance in dependency of the analyzing result. The number of entities governing the test criteria for the aspiration cycle is considerably reduced and unknown variations of such entities automatically considered.

The invention claimed is:

1. A method of aspirating a dose of a liquid by pipetting in an aspirating cycle, or of manufacturing a dose of a liquid including such aspirating method, the method comprising:
    a) moving a pipette containing a work fluid in an aspiration position;
    b) initiating at a point in time a suctioning action to said work fluid;
    c) analyzing at least one prevailing first parameter, being dependent from an effect of said suctioning action, within a first time span subsequent said initiating;
    d) determining at least one test-criterion in dependency of at least one result of said analyzing;
    e) checking at least one prevailing second parameter, being dependent from an effect of said suctioning action, within a second time span subsequent to said determining, upon whether said at least one prevailing second parameter does or does not fulfill said at least one test-criterion;
    f) identifying said aspirating cycle as acceptable or as not acceptable in dependency of a result of said checking, wherein said at least one test criterion comprises a range for at least one of
        a pressure value;
        a flow value;
        a first time-derivative of a pressure course;
        a first time-derivative of a flow course;
        a second time-derivative of a pressure course;
        a second time-derivative of a flow course,
    wherein said range of said at least one test criterion is constant over said second time span of said checking, or
    wherein said range of said at least one test criterion varies over said second time span of said checking with respect to its width and/or its average value characterized in that
    said analyzing comprises evaluating at least one of
        at least one value of a second time derivative of a pressure course; and of
        at least one value of a second time derivative of a flow course,
    and in that said determining said at least one test criterion comprises determining a first test criterion in dependency of said at least one value of a second time derivative evaluated during said analyzing.

2. The method of claim 1 said at least one prevailing first parameter comprising at least one of at least one pressure and of a flow dependent from at least one prevailing pressure in said work fluid, said work fluid being a liquid or at least comprising at least one gaseous section.

3. The method of claim 1 said at least one prevailing first parameter is at least one of at least one pressure and of a flow of said work fluid, said work fluid being a liquid or comprising at least one gaseous section.

4. The method of claim 1 wherein said at least one prevailing second parameter comprises at least one of at least one pressure and of a flow dependent from at least one prevailing pressure in said work fluid, said work fluid being a liquid or comprising at least one gaseous section.

5. The method of claim 1 said at least one prevailing second parameter is at least one of at least one pressure and of a flow of said work fluid, said work fluid being a liquid or comprising at least one gaseous section.

6. The method of claim 1, wherein said at least one prevailing first parameter comprising at least one of at least one pressure and of a flow at least dependent from at least one prevailing pressure in said work fluid said work fluid being a liquid or comprising at least one gaseous section and said at least one prevailing second parameter comprises at least one of at least one pressure and of a flow at least dependent from at least one prevailing pressure in said work fluid.

7. The method of claim 1, wherein:
said at least one prevailing first parameter is at least one of at least one pressure and of a flow of said work fluid, said work fluid being a liquid or comprising at least one gaseous section and
said at least one prevailing second parameter is at least one of at least one pressure and of a flow of said work fluid.

8. The method of claim 1, wherein
said analyzing comprises analyzing at least one first characteristic over time of said at least one prevailing first parameter.

9. The method of claim 1, said analyzing comprising analyzing at least one first characteristic over time of said at least one prevailing first parameter and wherein there prevails at least one of:
said at least one prevailing first parameter comprising at least one of at least one pressure and of a flow dependent from at least one prevailing pressure in said work fluid said work fluid being a liquid or comprising at least one gaseous section and of
said at least one prevailing first parameter is at least one of at least one pressure and of a flow of said work fluid said work fluid being a liquid or comprising at least one gaseous section and of
said at least one prevailing second parameter comprises at least one of at least one pressure and of a flow dependent from at least one prevailing pressure in said work fluid, said work fluid being a liquid or comprising at least one gaseous section and of
said at least one prevailing second parameter is at least one of at least one pressure and of a flow of said work fluid said work fluid being a liquid or comprising at least one gaseous section.

10. The method of claim 1 wherein determining said at least one test criterion comprises determining at least one rated second characteristic over time for said at least one prevailing second parameter.

11. The method of claim 1 wherein determining said at least one test-criterion comprises determining at least one rated second characteristic over time for said at least one prevailing second parameter and wherein there prevails at least one of:
said at least one prevailing first parameter comprising at least one of at least one pressure and of a flow at least dependent from at least one prevailing pressure in said work fluid said work fluid being a liquid or comprising at least one gaseous section and of
said at least one prevailing first parameter is at least one of at least one pressure and of a flow of said work fluid said work fluid being a liquid or comprising at least one gaseous section
said at least one prevailing second parameter comprises at least one of at least one pressure and of a flow dependent from at least one prevailing pressure in said work fluid said work fluid being a liquid or comprising at least one gaseous section and of
said at least one prevailing second parameter is at least one of at least one pressure and of a flow of said work fluid said work fluid being a liquid or comprising at least one gaseous section said analyzing comprises determining at least one first characteristic over time of said at least one prevailing first parameter.

12. The method of claim 1, wherein said analyzing comprises analyzing a first time derivative of at least one of at least one pressure and of a flow dependent from effect of said suctioning action.

13. The method of claim 1, wherein said analyzing comprises analyzing a first time derivative of at least one of at least one pressure and of a flow dependent from said effect of said suctioning action and wherein there prevails at least one of:
said work fluid being a liquid or comprising at least one gaseous section;
said at least one prevailing first parameter is at least one of at least one pressure and of a flow of said work fluid, said work fluid being a liquid or comprising at least one gaseous section
said at least one prevailing second parameter comprises at least one of at least one pressure and of a flow dependent from at least one prevailing pressure in said work fluid, said work fluid being a liquid or comprising at least one gaseous section
said at least one prevailing second parameter is at least one of at least one pressure and of a flow of said work fluid said work fluid being a liquid or comprising at least one gaseous section
said analyzing comprises determining at least one first characteristic over time of said at least one prevailing first parameter,
determining said at least one test-criterion comprises determining at least one rated second characteristic over time of said at least one prevailing second parameter.

14. The method of claim 1 wherein said analyzing comprises analyzing a first time derivative of at least one of at least one pressure and of a flow dependent from said effect of said suctioning action, said at least one pressure or said flow having the following prevailing time course:
the first time derivative alters after said point in time towards an extremum value occurring at a moment and returns to some extent after said moment;
said determining is performed within the time span between said point in time and said moment, latter inclusive.

15. The method of claim 1 wherein said analyzing comprises analyzing a first time derivative of at least one of at least one pressure and of a flow dependent from said effect of said suctioning action, said at least one pressure or said flow having the following prevailing time course:
the first time derivative alters after said point in time towards an extremum value occurring at a moment and returns to some extent after said moment;
said determining is performed within the time span between said point in time and said moment, latter inclusive and wherein there prevails at least one of:
said at least one prevailing pressure or flow is respectively at least one pressure or a flow of said work fluid, said work fluid being a liquid or comprising at least one gaseous section and of
said at least one prevailing second parameter at least comprises at least one of at least one pressure and of a flow at least dependent from at least one prevailing pressure in said work fluid, said work fluid being a liquid or comprising at least one gaseous section, and of said at least one prevailing second parameter is at least one of at least one pressure and of a flow of said work fluid, said work fluid being a liquid or comprising at least one gaseous section, and of said analyzing comprises analyzing a first time derivative of at least one of at least one pressure and of a flow dependent from said effect of said suctioning action, and of determining said at least one test-criterion comprises determining at least one rated characteristic over time of said at least one prevailing second parameter said checking is performed at a time subsequent said moment.

16. The method of claim 1 wherein said analyzing further comprises evaluating at least one of
- at least one pressure value;
- at least one flow value;
- at least one value of a first time derivative of a pressure course;
- at least one value of a first time derivative of a flow course.

17. The method of claim 1 wherein said at least one test criterion is a range and said checking is performed after said prevailing second parameter enters said range for a first time.

18. A pipetting apparatus configured to perform the method according to claim 1.

19. The method of claim 1, wherein said range of said at least one test criterion is constant over said second time span of said checking.

20. The method of claim 1, wherein said range of said at least one test criterion varies over said second time span of said checking with respect to its width and/or its average value.

21. The method of claim 1, wherein said at least one test criterion comprises more than one range for pressure values in more than one time spans of the aspiration cycle.

22. The method of claim 1, wherein said at least one test criterion comprises more than one range for the first time derivative and/or second time derivative of the time course of the pressure in more than one time spans of the aspiration cycle.

23. The method of claim 1, wherein one test criterion (C1) is determined from one single result value (V1) of said analyzing.

24. The method of claim 1, wherein more than one result values (V1, V2, . . . ) of said analyzing are combined by a determining stage to determine said at least one test criterion being a single test criterion as a function of said more than one result values (Cx(V1, V2, . . . )).

25. A pipetting apparatus comprising a pipette applicator arrangement for at least one pipette, a suction source in flow communication with an inner space of said pipette applicator arrangement, a sensor arrangement operationally connected to said inner space, the output of said sensor arrangement being operationally connected to an aspiration-cycle testing unit configured to perform reception of a control signal representative for the pipette applicator arrangement having reached an aspiration position;

initiating applying to said inner space a suctioning action by said suction source at a point in time;

analyzing a signal dependent from an output signal of said sensor arrangement subsequent to said initiating;

determining at least one test-criterion in dependency of a result of said analyzing;

checking in a second time span, subsequent to said determining, whether a signal dependent from an output signal of said sensor arrangement does or does not fulfill said at least one test-criterion;

generating an indication whether said aspiration cycle is acceptable or not acceptable in dependency of a result of said checking, wherein said at least one test criterion comprises a range for at least one of
- a pressure value;
- a flow value;
- a first time-derivative of a pressure course;
- a first time-derivative of a flow course;
- a second time-derivative of a pressure course;
- a second time-derivative of a flow course, wherein said range of said at least one test criterion is constant over said second time span of said checking, or wherein said range of said at least one test criterion varies over said second time span of said checking with respect to its width and/or its average value, characterized in that said analyzing comprises evaluating at least one of
- at least one value of a second time derivative of a pressure course;
- at least one value of a second time derivative of a flow course, and in that said determining said at least one test criterion comprises determining a first test criterion in dependency of said at least one value of a second time derivative evaluated during said analyzing.

* * * * *